United States Patent [19]

Seymour et al.

[11] Patent Number: 4,950,717
[45] Date of Patent: Aug. 21, 1990

[54] BLENDS OF POLYESTER-ETHERS WITH ETHYLENE-ACRYLIC ACID COPOLYMERS

[75] Inventors: Robert W. Seymour; Thomas E. Flora, both of Kingsport, Tenn.

[73] Assignee: Eastman Kodak Company, Rochester, N.Y.

[21] Appl. No.: 360,571

[22] Filed: Jun. 2, 1989

Related U.S. Application Data

[63] Continuation-in-part of Ser. No. 189,899, May 3, 1988, abandoned.

[51] Int. Cl.⁵ .................... C08L 67/02; C08L 33/02
[52] U.S. Cl. .................................. 525/172; 525/173; 525/176
[58] Field of Search ............... 525/172, 173, 176, 64

[56] References Cited

U.S. PATENT DOCUMENTS

| | | | |
|---|---|---|---|
| 4,010,222 | 3/1977 | Shih | 525/176 |
| 4,349,469 | 9/1982 | Davis | 524/765 |
| 4,766,174 | 8/1988 | Statz | 525/64 |

*Primary Examiner*—Patricia Short
*Attorney, Agent, or Firm*—J. Frederick Thomsen; William P. Heath, Jr.

[57] ABSTRACT

A compatible polymer blend, comprising
(i) about 10 to 90 weight percent of an ethylene-acrylic acid copolymer comprising from about 10 to 50 mole percent acrylic acid monomer units; and
(ii) about 90 to 10 weight percent of a polyester-ether derived from 1,4-cyclohexane dicarboxylic acid, 1,4-cyclohexane dimethanol and poly(oxytetramethylene) glycol.

9 Claims, No Drawings

BLENDS OF POLYESTER-ETHERS WITH ETHYLENE-ACRYLIC ACID COPOLYMERS

This application is a continuation-in-part of our co-pending application Ser. No. 189,899 filed May 3, 1988, now abandoned.

BACKGROUND OF THE INVENTION

1. Field of the Invention

The present invention relates to thermoplastic molding compositions and more particularly, to thermoplastic shapable blends of an ethylene-acrylic acid copolymer and a polyester ether based on 1,4-cyclohexanedicarboxylic acid, 1,4-cyclohexanedimethanol and poly(oxytetramethylene) glycol.

2. Discussion of the Background

Polyester-ethers such as those described in U.S. Pat. No. 4,349,469 possess good melt strength and are particularly valuable for use in the manufacture of extrusion blow molded objects. For example, such polyester-ethers can be extruded downward in the shape of a hollow cylinder. Containers can be formed by clamping a mold around the molten cylinder and subjecting the hollow cylinder to internal pressure to form a bag or similar article. Bags manufactured from polyester-ethers are suitable for the packaging sterile pharmaceutical solutions intender for intravenous administration.

Polyester-ether bags manufactured for packaging intravenous solutions typically must be packaged in an overwrap of high density polyethylene or coated with a poly(vinylidene chloride) polymer latex to reduce the water vapor transmission rate. Rather than using the known overwrap or coating techniques, it would be advantageous if the polyester ethers could be blended with another polymer which would impart the desired low water vapor transmission rate to the resulting polymer blend. However, most polymers capable of decreasing the water vapor transmission rate of polyester-ethers are not compatible with the polyester-ethers as evidenced by the optical characteristics, i.e., poor clarity or haze, of films and bags prepared from blends of polyester-ethers with the incompatible polymers Good optical clarity is essential to allow observation or inspection of the contents of the bag. Good clarity also is critical for a variety of other types of packaging and medical applications for which polyester-ethers are suited.

SUMMARY OF THE INVENTION

We have discovered that blends of unneutralized ethylene-acrylic acid copolymers and certain polyester-ethers are unique in that the two types of polymers exhibit excellent compatibility as demonstrated by the clarity of film prepared from the blend. When compared to the unmodified polyester-ethers, the blends have a reduced modulus and a lower water vapor transmission rate. Our invention thus concerns a composition suitable for molding or extruding into film and other shaped articles comprising from about 10 to 90 weight percent of an ethylene-acrylic acid copolymer and from about 90 to 10 weight percent of a polyester-ether described in detail hereinbelow.

DETAILED DESCRIPTION OF THE PREFERRED EMBODIMENTS

The present invention involves the discovery that unneutralized ethylene-acrylic acid copolymers and certain polyester-ethers derived from 1,4-cyclohexane dicarboxylic acid, 1,4-cyclohexanedimethanol, poly(oxytetramethylene) glycol (PTMG) and, optionally, a polyfunctional branching agent can be melt blended to form compatible compositions. The blends are unique in that they exhibit excellent clarity in contrast to blends of the polyester-ethers with neutralized or partially neutralized ethylene-acrylic acid copolymers and other modified and unmodified polyolefins. Relative to the unmodified polyester-ethers, the blends of the present invention exhibit low water vapor transmission rates and a reduced modulus, as well. The blends are, therefore, flexible and have properties which are desirable for packaging, wrapping and medical applications. The reduced water vapor transmission properties make the blends of the present invention ideal for medical packaging, particularly the packaging of intraveneous solutions.

U.S. Pat. No. 4,010,222 discloses blends of different polyester-ethers with neutralized or partially neutralized copolymers containing polymerized ethylene units and polymerized carboxylic acid units. The disclosed polyester-ethers are derived f&om one or more benzenedicarboxylic acids, 1,4-butanediol and poly(tetramethylene glycol). We have found that the clarity of blends of the polyester-ethers described herein with the neutralized or partially neutralized ethylene/carboxylic acid copolymers of U.S. Pat. No. 4,010,222 is substantially inferior to that of our novel blends. More specifically, we have found that the clarity of blends of Surlyn 8660 and Surlyn 9950 ethylene/methacrylic acid copolymers with the polyester-ether component of our novel blends is not sufficient for the uses described above. Surlyn 8660 contains 10.4 mole percent methacrylic acid residues and is 40 percent neutralized with sodium whereas Surlyn 9950 contains 14 mole percent methacrylic acid residues and is 20 percent neutralized with zinc ions.

Polyester-ethers derived from 1,4-cyclohexanedicarboxylic acid, 1,4-cyclohexanedimethanol and poly(oxytetramethylene) glycol are described in U.S. Pat. Nos. 3,023,192, 3,261,812, 3,651,014, 4,003,882 and 4,221,703. Polyester-ethers derived from 1,4-cyclohexanedicarboxylic acid having a high trans isomer content, 1,4-cyclohexanedimethanol and poly(oxytetramethylene) glycol having a molecular weight within a particular range are disclosed in U.S. Pat. No. 4,349,469. The polyester-ethers described in the last-mentioned patent possess improved melt strength and clarity which renders them particularly useful for the production of molded articles such as bags, bottles and film.

The polyester-ether component of our novel compositions has an inherent viscosity of about 0.8 to 1.5 and comprises:

(1) 1,4-cyclohexanedicarboxylic acid having a trans isomer content of at least 70, and preferably, at least 80 mole percent;

(2) a glycol component comprising:
  (a) 1,4-cyclohexanedimethanol, preferably having a trans isomer content of at least 60 mole percent,
  (b) from about 15 to 50 weight percent, based on the weight of the polyesterether, of poly(oxytetramethylene)glycol having a molecular weight of about 500 to 1100; and (3) from 0 to about 1.5 mole percent, based on the mole percent of the acid or glycol component, of a branching agent having at least three carboxyl and/or hydroxyl groups.

The polyester-ethers may be prepared according to known procedures such as those disclosed in the patents cited hereinabove. The 1,4-cyclohexanedicarboxylic acid residue may be derived from either the diacid itself or from an ester forming equivalent thereof such as a dialkyl ester. The poly(oxytetramethylene) glycol component preferably has a molecular weight of about 1000 and preferably is used in an amount of from 20 to 35 weight percent, based on the weight of the polyester ether.

The polyester-ether component may contain up to about 1.5 mole percent, based on the acid or glycol component, of a polyfunctional branching agent derived from a compound having at least three carboxyl and/or hydroxy groups. Examples of such compounds include trimellitic acid or anhydride, trimesic acid, trimethylolethane, trimethylolpropane and trimer acid.

The dicarboxylic acid component and glycol component each total 100 mole percent. Although the amount of poly(oxytetramethylene) glycol component is specified herein as a weight percent, the total mole percent of the cyclohexanedimethanol, poly(oxytetramethylene) glycol and polyol branching agent, if any, employed is 100 percent.

The polyester-ethers may be modified with minor amounts, e.g., up to about 10 mole percent, of other glycols and dicarboxylic acids so long as the necessary or desired properties are not unduly affected. Examples of such other glycols and diacids include alkylene glycols having from 2-10 carbon atoms, such as, for example, ethylene glycol and propylene glycol, and aliphatic and aromatic dicarboxylic acids.

The unneutralized ethylene-acrylic acid copolymer component of our novel compositions is comprised of ethylene and acrylic acid monomers and may be copolymerized by known free-radical initiated polymerization. Conventional emulsion polymerization reactions may be utilized, for example, to prepare a particulate copolymer. Polymerization is generally conducted at temperatures from about 30-50° C. and can be continued to high conversion ratios. Suitable ethylene-acrylic acid copolymers are available from Union Carbide (Bakelite EAA) and Dow Chemical (Primacor).

The unneutralized ethylene-acrylic acid copolymer component contains from about 10 to 50 mole percent acrylic acid monomer units which may occur in a random distribution throughout the copolymer. Preferred copolymers contain from about 20 to 30 mole percent acrylic acid monomer units. Suitable ethylene-acrylic acid copolymers have a melt index at 190° C. (an indication of molecular weight) in the range of about 3 to 3000, preferably in the range of about 150 to 400.

The molding compositions provided by this invention are comprised of from about 10 to 90 weight percent of the ethylene-acrylic acid copolymer and from about 90 to 10 weight percent of the polyester-ether. Preferably, the ethylene-acrylic acid copolymer is present in the range of about 25 to 75 weight percent and the polyester-ether component is present in the range of about 75 to 25 weight percent.

Blending of the two polymer resins may be achieved by extensive mechanical blending or by conventional melt extrusion methods, such as with a single-screw or double-screw extruder. Obviously, however, any suitable means for blending two polymer resins may be used to blend the copolymer and elastomer of the present blend.

As used herein, inherent viscosity (IV) is measured at 25° C. using 0.50 gram of polymer per 100 mL of a solvent consisting of 60 weight percent phenol and 40 weight percent tetrachloroethane.

Our invention is further illustrated by the following examples.

EXAMPLES 1-3

Polyester-ether PCCE 9965 and Bakelite EAA 9500 unneutralized ethylene-acrylic acid copolymer were blended in weight ratios of 1:3 (Example 1), 1:1 (Example 2) and 3:1 (Example 3) by dry-mixing pellets and then extruding the pellet mixture into film on a 0.75 inch extruder. The PCCE 9965 had an inherent viscosity of 1.05 and consisted of 99.5 mole percent trans 1,4-cyclohexanedicarboxylic acid monomer units, 0.5 mole percent trimellitic anhydride monomer units, 1,4-cyclohexanedimethanol (70 mole percent trans isomer) monomer units and 25 weight percent, based on the weight of the polyester-ether, of poly(oxytetramethylene) glycol having a molecular weight of 1000. The PCCE 9965 contained 0.2 weight percent of Irganox 1010 stabilizer. The Bakelite EAA 9500 had an ethylene content of approximately 80 mole percent, an acrylic acid content of approximately 20 mole percent and a melt index of 272. Film samples were also prepared from unmodified PCCE 9965 polyester-ether (Control Example 1) and from unmodified Bakelite EAA 9500 ethylene-acrylic acid copolymer (Control Example 2).

Each of the film samples was rated for clarity and tested for water vapor transmission rate (ASTM F372), modulus (machine direction) (ASTM D882) and tensile properties: yield stress (ASTM D882), break stress (ASTM D882) and break elongation (ASTM D882). The clarity rating and values for water transmission rate (g-mil/100 in.$^2$.24 hr) modulus (pounds per in.$^2$), yield stress (pounds per in.$^2$), break stress (pound per in.$^2$) and break elongation (%) determined for each of the samples are set forth in Table I.

TABLE I

| Example | Clarity | Water Vapor Transmission Rate | Modulus | Yield Stress | Break Stress | Break Elongation |
|---|---|---|---|---|---|---|
| C-1 | Good | 42.5 | 25,000 | 1,430 | 4,340 | 622 |
| 1 | Excellent | 14.1 | 15,000 | 1,100 | 3,720 | 435 |
| 2 | Excellent | 8.4 | 12,000 | 1,200 | 3,390 | 504 |
| 3 | Excellent | 5.2 | 11,000 | 780 | 2,120 | 402 |
| C-2 | Excellent | 2.1 | 11,000 | 1,090 | 3,160 | 436 |

It can be seen from Table I that as the amount of ethylene-acrylic acid copolymer increases in the polymer blend, the water vapor transmission rate decreases. Conversely, with increasing ethylene-acrylic acid copolymer content, the modulus and tensile properties of the blend are gradually degraded. The particular ratio of the two polymer components present in the blend will depend on the specific application for which the blend is intended. For example, in applications in which the water vapor transmission rate is preferably as low as possible, one can prepare a polymer blend having a high content of ethylene-acrylic acid copolymer, i.e., in the range rom about 50-90 weight percent. Conversely, where water vapor transmission rate properties are less important, but one desires substantial modulus and tensile strength, one may produce blends having increased amounts of the polyester-ether, i.e., blends comprising 50-90 weight percent of the polyester-ether. One skilled in the art will be readily able to adjust the respective properties of the blend to match the desired application based on simple preliminary experiments.

The clarity and compatibility of the polyester-ethers and unneutralized ethylene-acrylic acid copolymers is unique in view of the lack of clarity and compatibility of the elastomer with other polyolefins and acid-modified polyolefins. The clarity of the present blends is especially surprising in view of the poor clarity of blends of the polyester-ethers with neutralized or partially neutralized ethylene-methacrylic acid copolymers (Surlyn ®). Comparative ratings illustrating the clarity of polyester-ether blends with other olefins and acid-modified olefins is shown in Table II. All of the blends tested exhibited only fair to poor clarity in blends containing 25, 50 and 75 wt.% elastomer. In contrast, the blends of the present invention shown in Table I all exhibit excellent clarity.

TABLE II

| Clarity of PCCE Blends | | | |
|---|---|---|---|
| Second | Weight Percent | | |
| Component | 25 | 50 | 75 |
| Elvax 460 (EVA) | Poor | Fair | Fair |
| Surlyn 8660 | Fair | Fair | Fair |
| Surlyn 9950 | Fair | Fair | Good |
| Poly-1-butene | Fair | Fair | Fair |
| Polyallomer | Poor | Poor | Poor |

The blends of the present invention may additionally contain additives such as stabilizers, colorants and processing aids as well as reinforcing fillers. Since the blends of the present invention will find substantial use in automotive, medical and packaging applications, in which the clarity and transparency of the blends is a desirable feature, the additives should be selected so as not to substantially interfere with the clarity and transparency of the blend when used for these applications. For example, in packaging applications such as blown containers, the blend may contain reinforcing agents such as glass or inorganic fibers or flakes, or polymeric fibers such that the transparency of the blend is not impaired.

For applications in which the transparency of the blend is not critical, coloring agents, reinforcing fillers and additives which affect the transparency of the blend may be added in amounts which do not deleteriously affect the tensile strength, impact strength and flexural modulus of the overall blend.

Obvious, numerous modifications and variations of the present invention are possible in light of the above teachings. It is therefore to be understood that within the scope of the appended claims, the invention may be practiced otherwise than as specifically described herein.

We claim:

1. A composition comprising a compatible blend of:
   A. about 10 to 90 weight percent of an unneutralized ethylene-acrylic acid copolymer containing about 10 to 50 mole percent acrylic acid monomer units; and
   B. about 90 to 10 weight percent of a polyester-ether having an inherent viscosity of about 0.8 to 1.5 comprised of
      (1) 1,4-cyclohexanedicarboxylic acid having a trans isomer content of at least 70 mole percent;
      (2) a glycol component comprising:
         (a) 1,4-cyclohexanedimethanol having a trans isomer content of at least 60 mole percent,
         (b) from about 15 to 50 weight percent, based on the weight of the polyester-ether, of poly(oxytetramethylene)glycol having a molecular weight of about 500 to 1100; and
      (3) from 0 to about 1.5 mole percent, based on the mole percent of the acid or glycol component, of a branching agent having at least three carboxyl and/or hydroxyl groups.

2. A composition according to claim 1 wherein the ethylene-acrylic acid copolymer component contains about 20 to 30 mole percent acrylic acid and has a melt index at 190° C. of about 150 to 400.

3. A composition comprising a compatible blend of:
   A. about 25 to 75 weight percent of an unneutralized ethylene-acrylic acid copolymer having a melt index at 190° C. of about 150 to 400 containing about 20 to 30 mole percent acrylic acid monomer units; and
   B. about 75 to 25 weight percent of a polyester-ether having an inherent viscosity of about 0.8 to 1.5 comprised of
      (1) 1,4-cyclohexanedicarboxylic acid having a trans isomer content of at least 70 mole percent;
      (2) a glycol component comprising:
         (a) 1,4-cyclohexanedimethanol having a trans isomer content of at least 60 mole percent,
         (b) from about 15 to 50 weight percent, based on the weight of the polyester-ether, of poly(oxytetramethylene)glycol having a molecular weight of about 500 to 1100; and
      (3) from 0 to about 1.5 mole percent, based on the mole percent of the acid or glycol component, of a branching agent having at least three carboxyl and/or hydroxyl groups.

4. A composition according to claim 3 wherein the glycol component of the polyester-ether comprises about 20 to 35 weight percent of the poly(oxytetramethylene)glycol.

5. A composition according to claim 3 wherein the glycol component of the polyester-ether comprises about 20 to 35 weight percent poly(oxytetramethylene)glycol having a molecular weight of about 1000 and the polyester-ether contains about 0.5 mole percent trimellitic anhydride monomer units.

6. A molded or extruded article of the composition of claim 1.

7. A molded or extruded article of the composition of claim 3.

8. A film of the composition of claim 3.

9. The film of claim 8 prepared by extrusion, blown film extrusion or extrusion blow-molding.

* * * * *